Nov. 14, 1961 E. T. TODD 3,008,694
COACH HEATING, COOLING AND VENTILATING SYSTEM
Original Filed Oct. 15, 1947 12 Sheets-Sheet 2

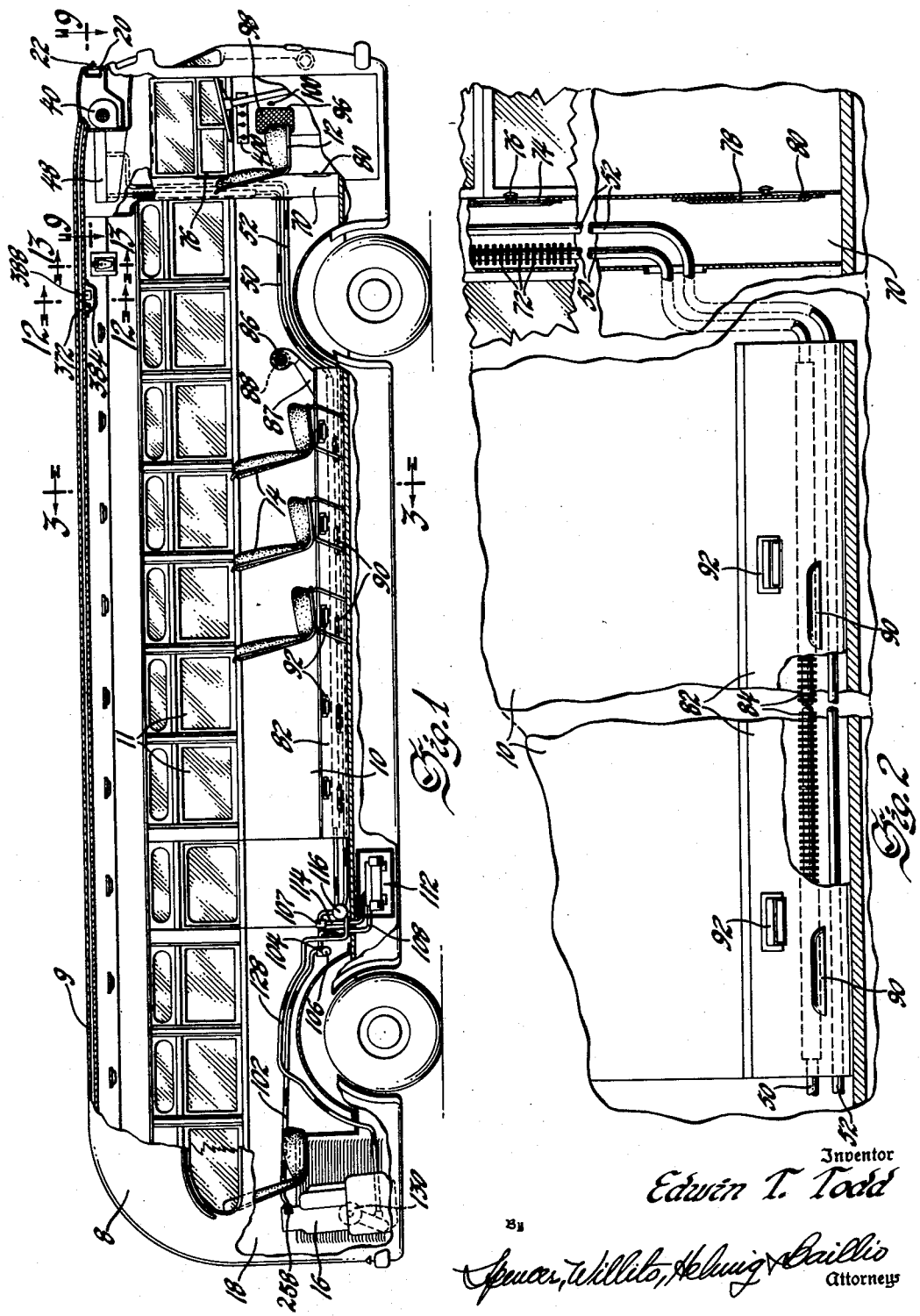

Inventor
Edwin T. Todd
By
Spencer, Willits, Helwig & Baillio
Attorneys

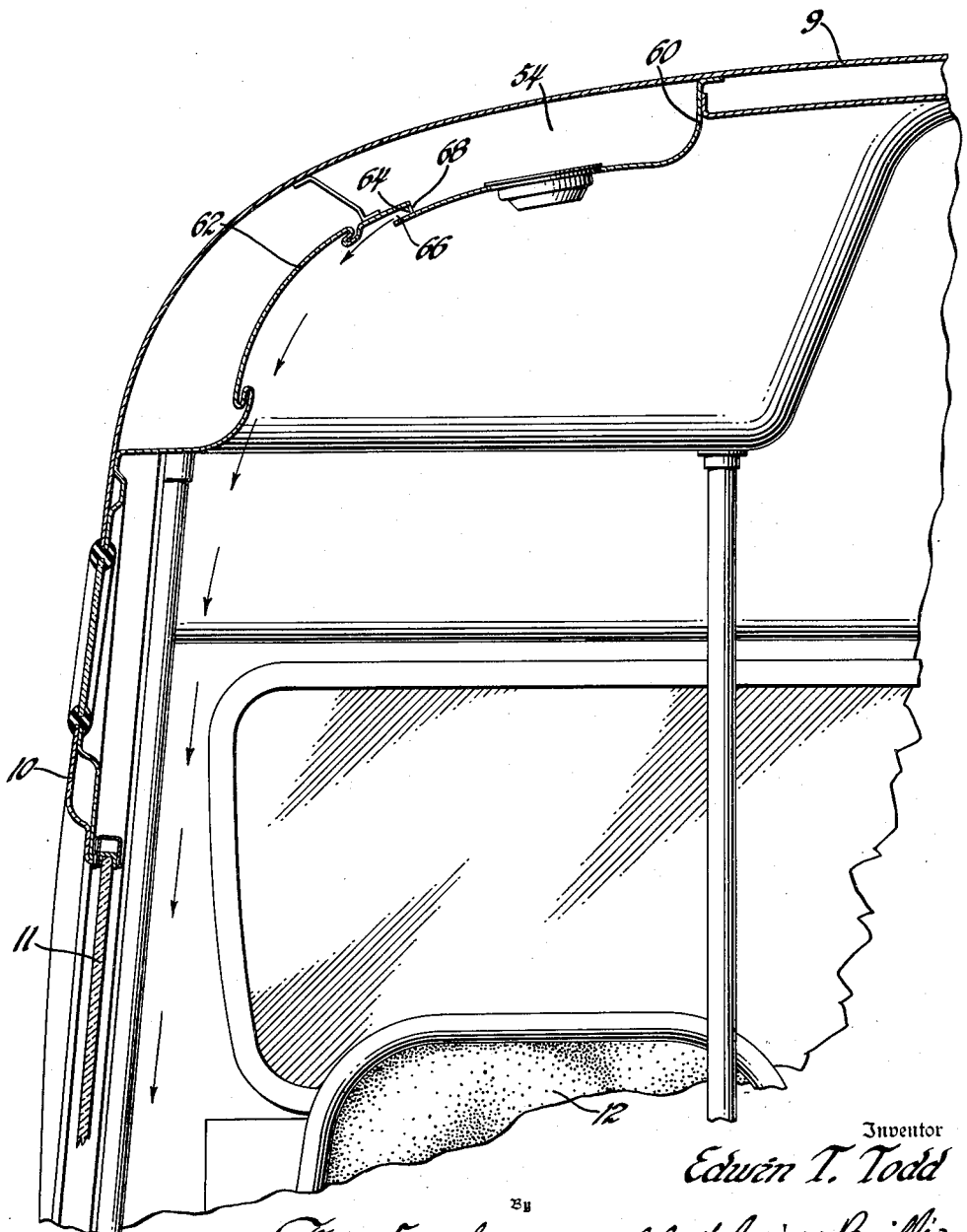

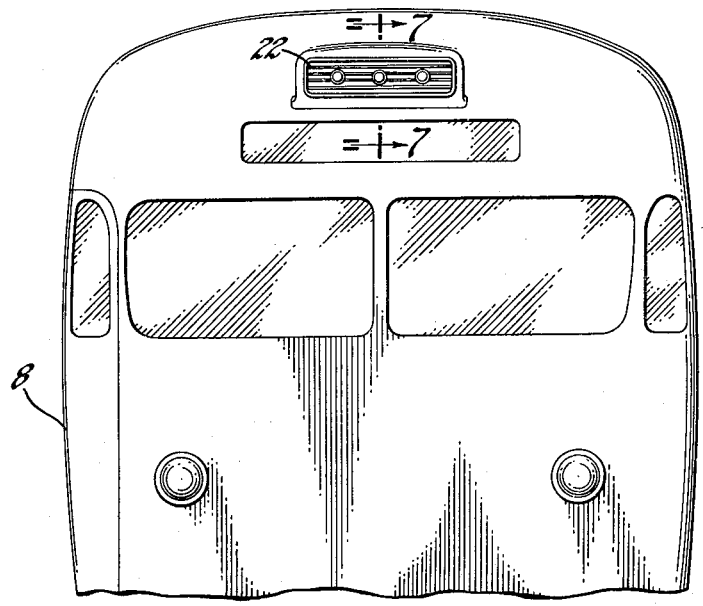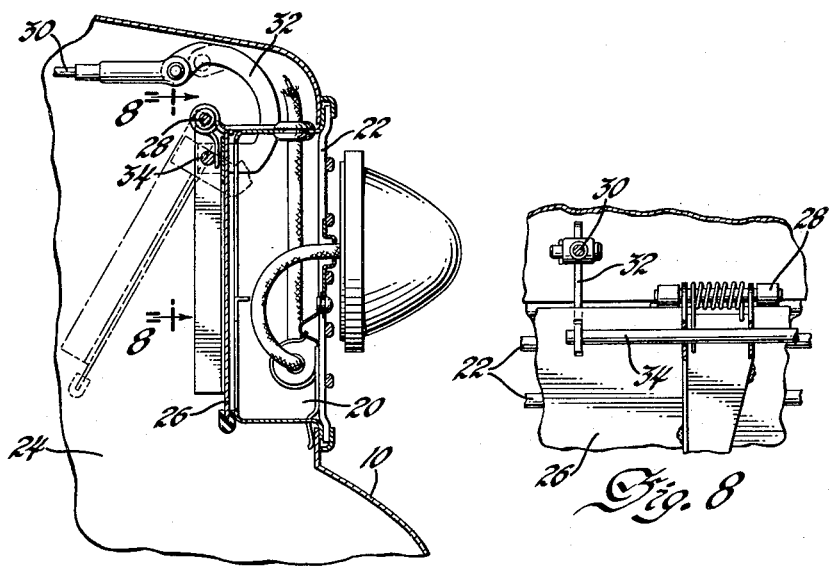

Nov. 14, 1961            E. T. TODD            3,008,694

COACH HEATING, COOLING AND VENTILATING SYSTEM

Original Filed Oct. 15, 1947            12 Sheets—Sheet 5

Inventor
Edwin T. Todd
By
Spencer, Willits, Helwig & Baillio
Attorney

Nov. 14, 1961 E. T. TODD 3,008,694
COACH HEATING, COOLING AND VENTILATING SYSTEM
Original Filed Oct. 15, 1947 12 Sheets-Sheet 6
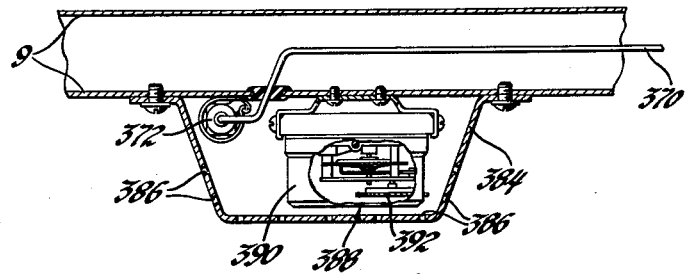
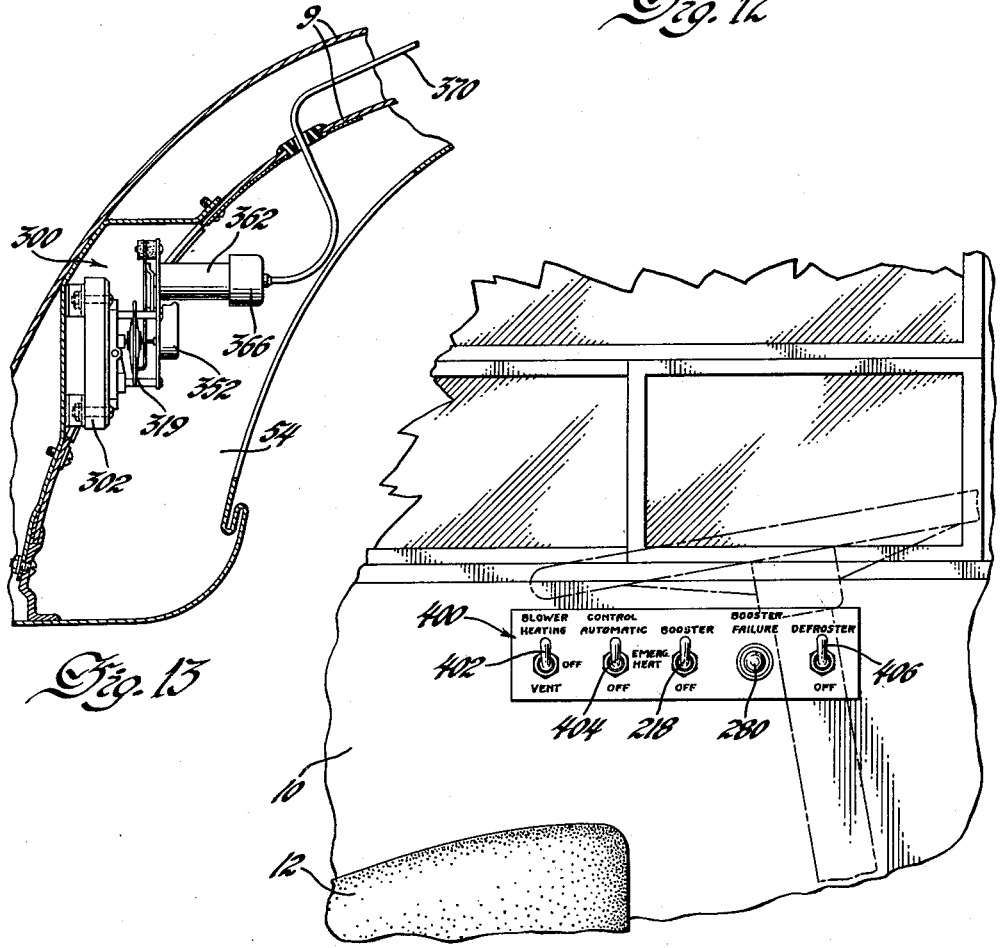
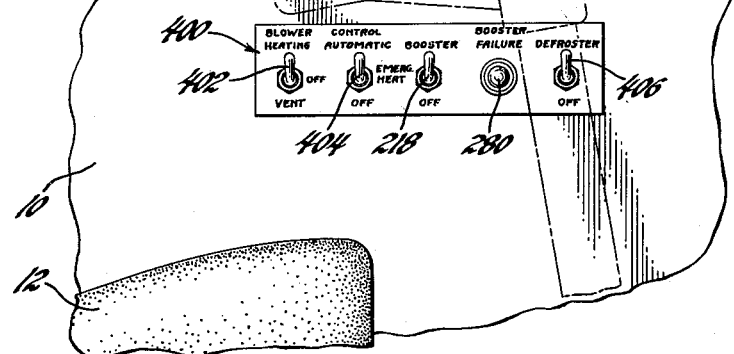
Inventor
Edwin T. Todd
By
Spencer, Willito, Helmig, Baillio
Attorneys

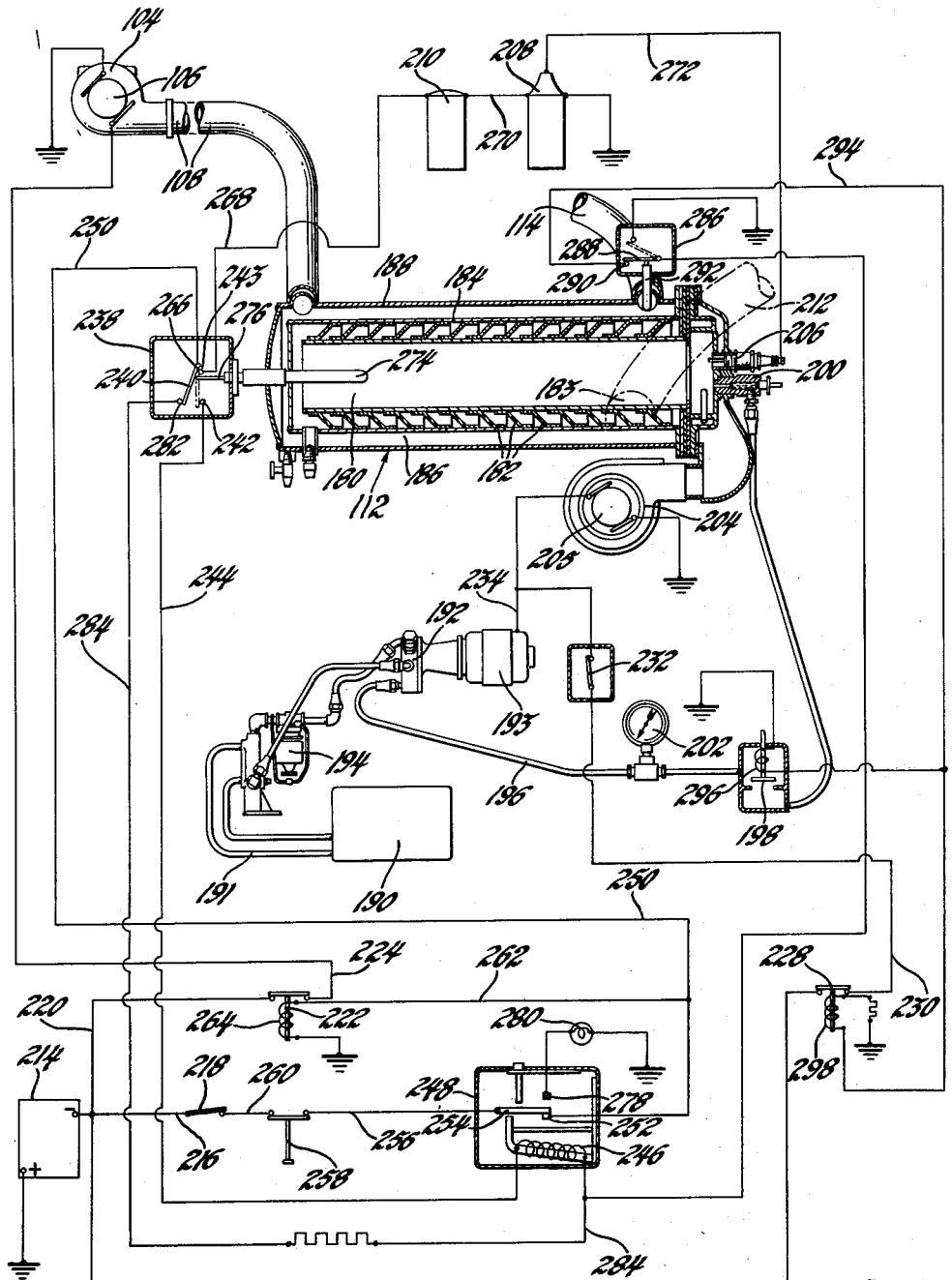

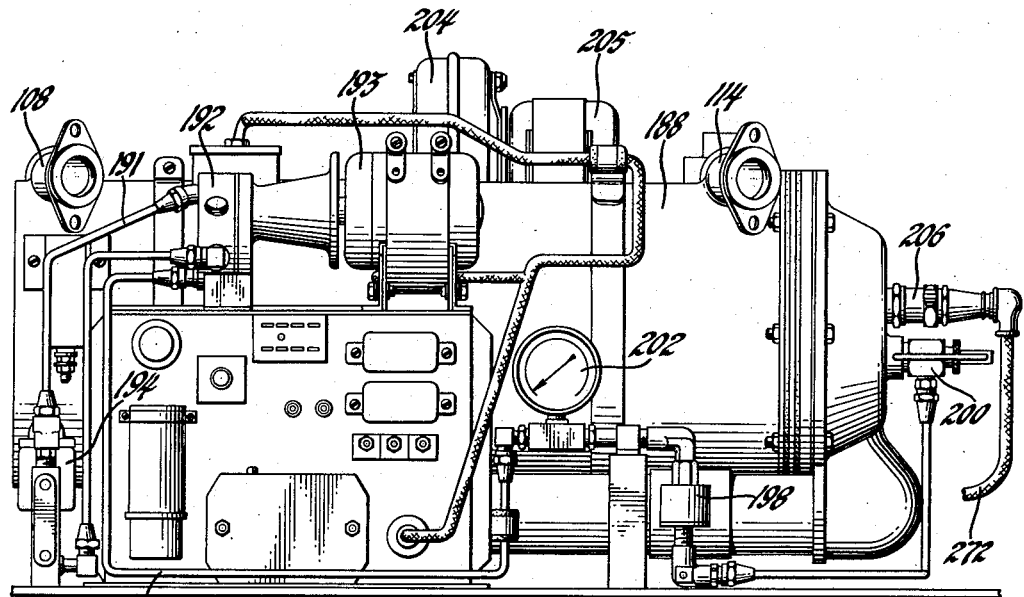
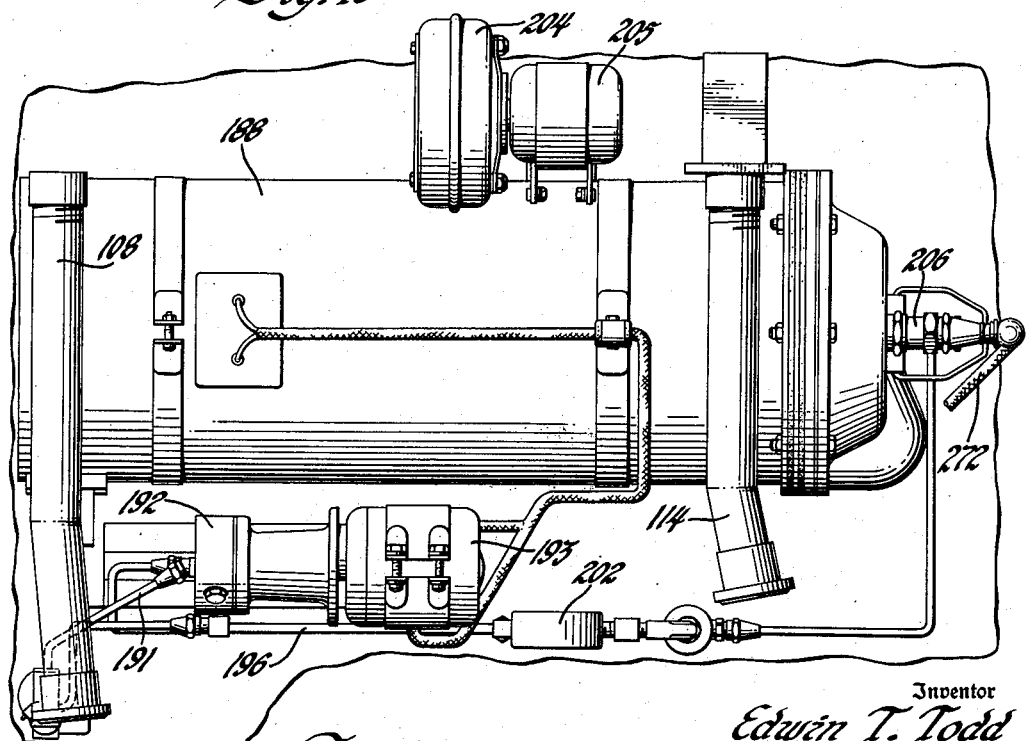

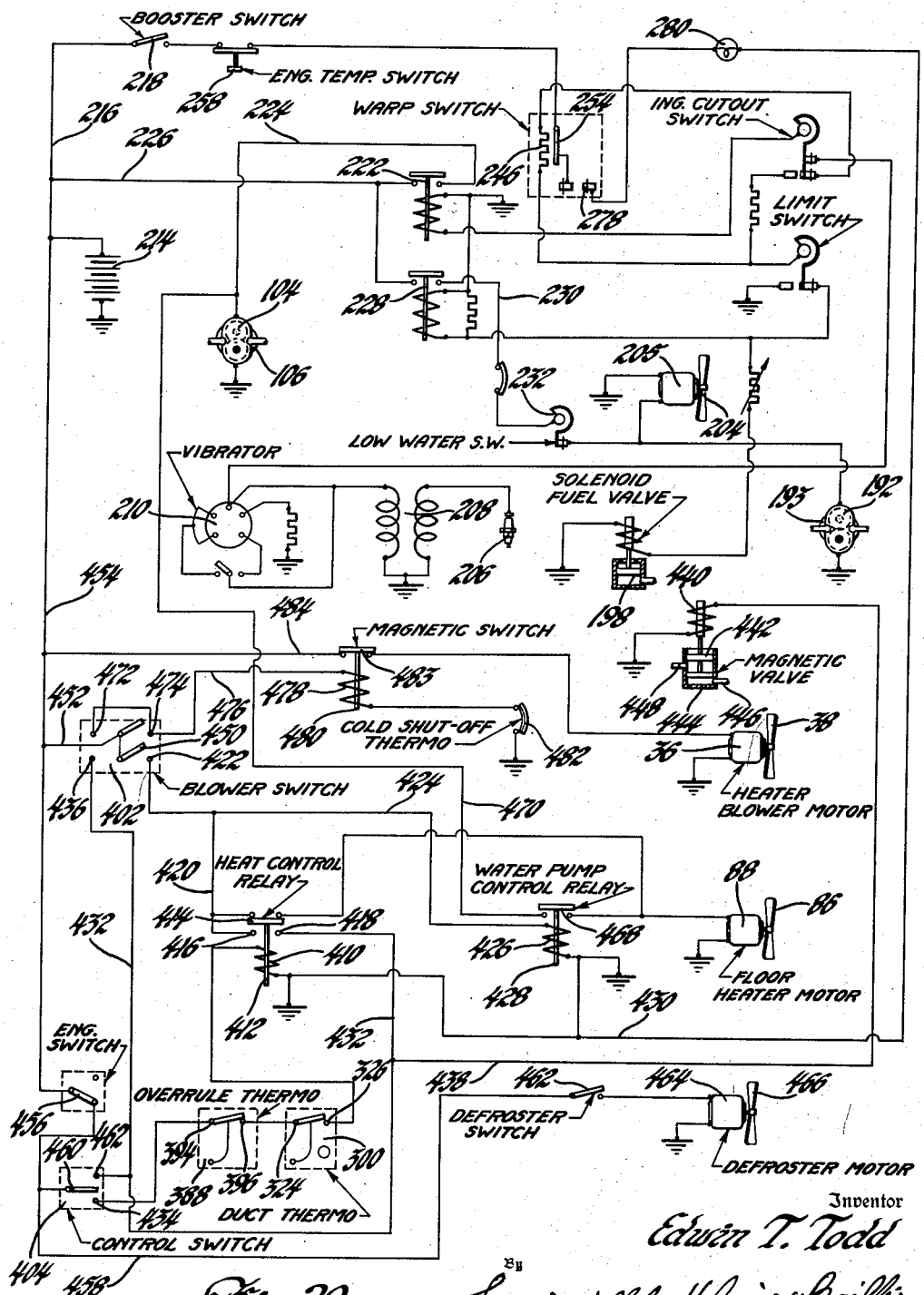

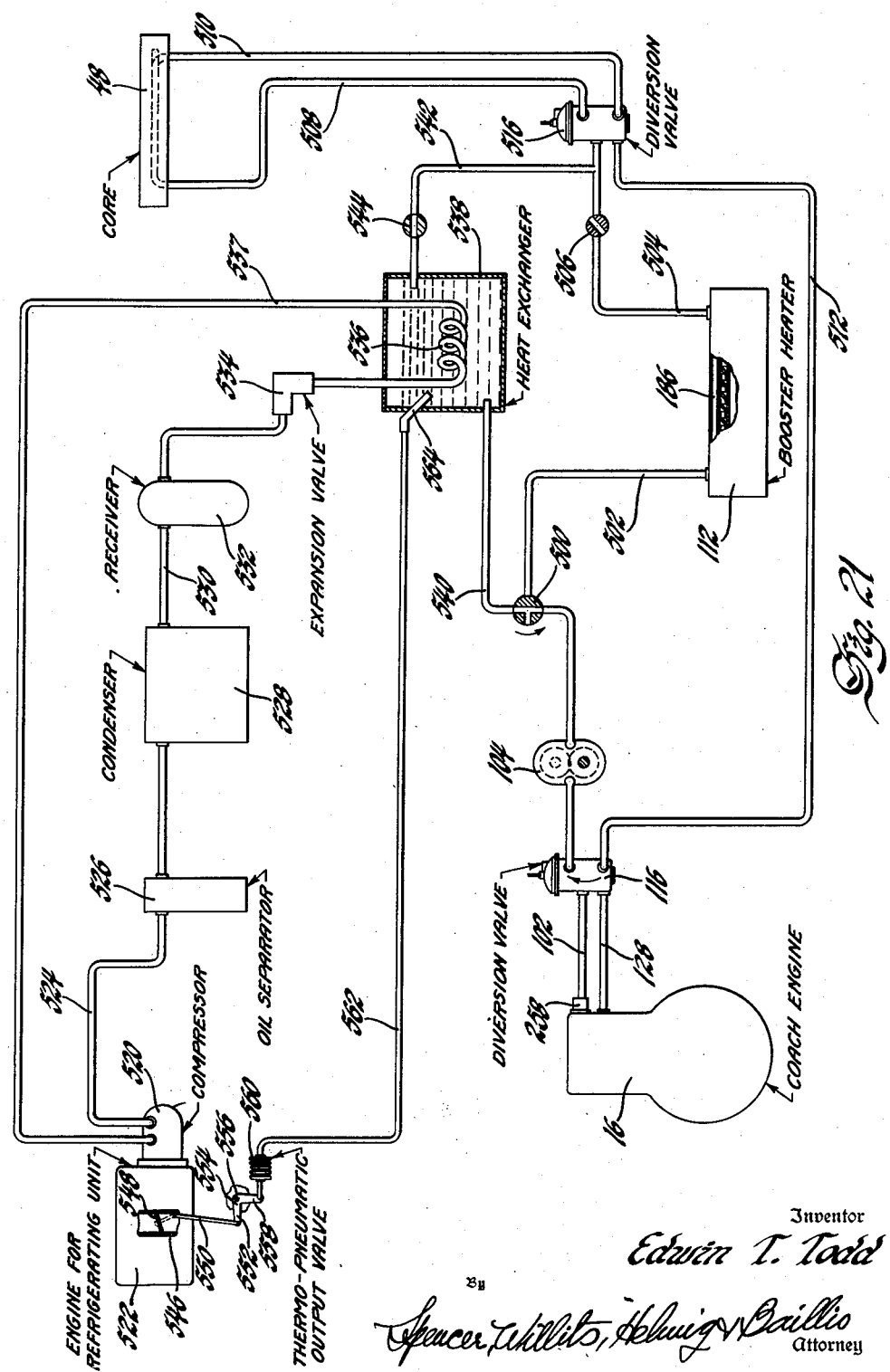

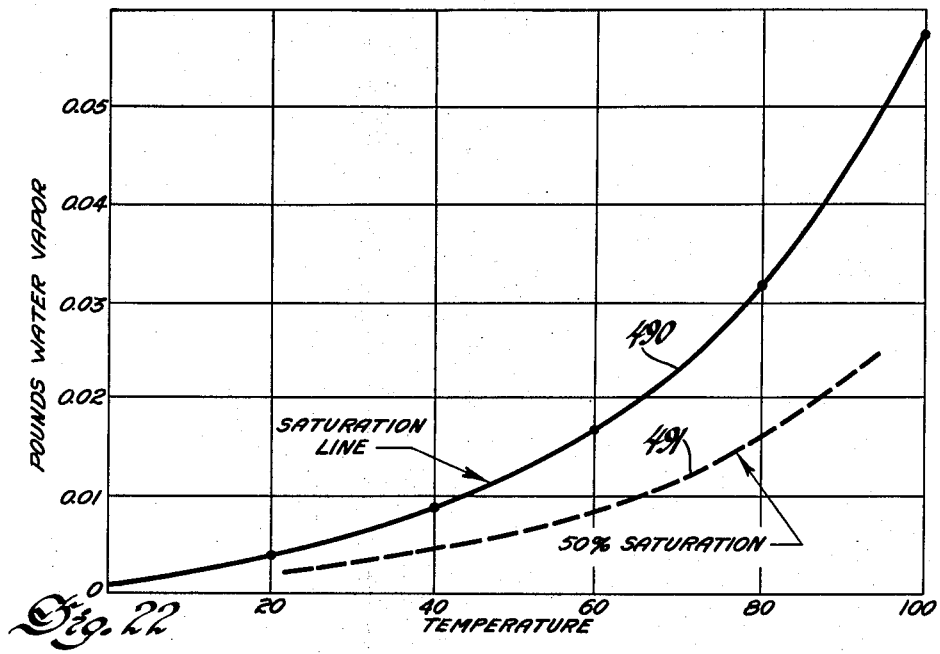
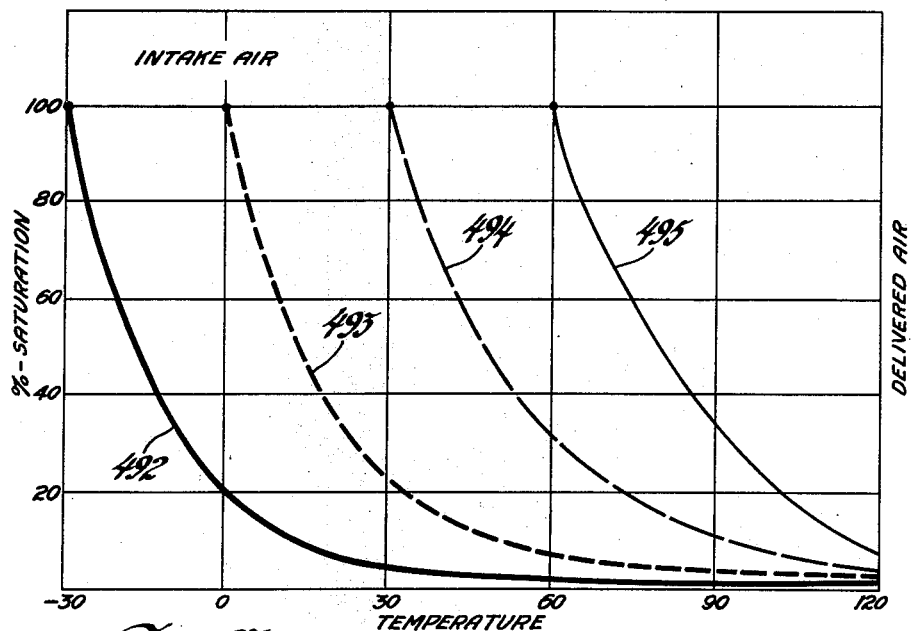

United States Patent Office 3,008,694
Patented Nov. 14, 1961

3,008,694
COACH HEATING, COOLING AND
VENTILATING SYSTEM
Edwin T. Todd, Pontiac, Mich., assignor to General Motors Corporation, Detroit, Mich., a corporation of Delaware
Continuation of abandoned application Ser. No. 779,919, Oct. 15, 1947. This application June 29, 1951, Ser. No. 234,168
10 Claims. (Cl. 257—293)

This invention relates to a heating, cooling and ventilating system for motor driven passenger coaches. The application is a continuation of copending application Serial No. 779,919, filed October 15, 1947, now abandoned.

One of the objects of the invention is to provide such a system wherein the temperature of the air within the coach is constantly kept within a desired range by automatically adding heat to outside air which is being taken into the coach.

Another object is to provide such a system wherein a relatively large amount of outside air is taken into the coach in order that there will be an adequate supply of fresh air for the maximum number of passengers which the coach can carry, and so that the interior of the coach body will be spaced under pressure somewhat greater than atmospheric to insure that any leakage of air through the openings around the doors or windows will be outward rather than inward, to protect the passengers from drafts of cold air.

A further object is to so distribute the heated air that the windows of the coach will be kept clear of condensation at all times. This is accomplished by conducting the air from the front to the back of the coach through ducts located at each side above the windows, and by discharging the air through slots which so direct the air that it flows downwardly over the inner faces of the windows. This not only prevents moisture from condensing on the windows, but also provides a layer of warm air between the window and the passengers for warming the windows. Warm windows do not absorb heat radiated by the passengers as fast as cold windows absorb such heat and the passengers therefore do not tend to feel chilled as they might feel were they sitting close to colder windows. Hot bodies tend to radiate heat to colder bodies regardless of the temperature of the surrounding air so that it is possible for passengers to feel cold in a coach where the air temperature is very warm. This may occur for the reason that such passengers may lose heat by radiation to colder objects that may be near, such as to cold windows. By increasing the temperature of the windows by discharging a thin layer or blast of warm air downwardly against the surfaces of the windows, this tendency of the passengers to radiate heat to the windows is reduced.

The warm air, after passing by the windows, continues to move downwardly until it approaches the floor, whereupon it moves toward the center of the coach until it meets the warm air coming from the other side of the coach, the two then merging and rising toward the top of the coach at the center thereof. Upon nearing the roof, some of the air which has risen at the center is drawn outwardly and then downwardly again by entrainment with the air being discharged through the slots in the ducts over the windows. Since the outlet for air to leave the coach is adjacent the front end thereof, the tendency is for the air being circulated as described above to move from the rear to the front of the coach, with the result that there is a constant change of air at all points within the coach.

Another object of the invention is to provide thermostatic control means which will automatically supply heat from the engine cooling circulating system to the air being taken in from outside the coach, there being two such thermostatic controls, one being located in one of the ducts through which the heated air is being conducted back into the coach, and being actuated by changes in the temperature of the air within the duct, but being also subject to the action of a compensating element located outside the duct, and the other thermostatic control being located adjacent the roof of the coach so that it is actuated by changes in the temperature of the air at that point. The system is so arranged that heat will be supplied to the air being taken in from outside the coach as long as either of these thermostatic controls is calling for heat, but as soon as both controls are "satisfied" by the temperature of the air at the point where they are located reaching the desired amount, then the supply of heat from the engine is immediately cut off to prevent the coach from becoming overheated. One of the functions of the duct thermostat is to prevent the temperature of the air flowing in the ducts from falling below a predetermined point which would result in discomfort to the passengers. If only one thermostatic control were provided for controlling the flow of hot water to the heater, and that was responsive to the temperature of the air within the coach, it might be "satisfied" because of the sufficiently high temperature of the air surrounding it and operate to shut off the flow of hot water to the heat radiating member, which under some circumstances could result in the condition of air too cool for comfort flowing through the ducts and being discharged down around the passengers. By locating the one thermostat in the duct, provision is made to insure that whenever the temperature of the air flowing therein drops below a predetermined point, heat will be added to it. The duct thermostat, by keeping the temperature of the air flowing therein above a predetermined degree, also insures that the temperature of the interior walls of the ducts will be kept high enough at all times so that they cannot become cold panels that would tend to absorb heat, which would result in a feeling of discomfort to the passengers, and upon which the vapor present in the air within the coach might tend to become condensed as moisture.

Another object is to provide separate means for heating the space immediately adjacent the operator's seat, through which means heated air is discharged both at floor and shoulder levels, the amount of air being discharged at both points being subject to control by the operator, independently of the automatic controls.

Since the primary source of heat for the system is the hot water from the engine cooling circulating system, another object is to provide auxiliary means for increasing the temperature of the water during periods when the water coming from the engine would not be hot enough to supply the necessary amount of heat for the heating system, such as at starting, in extremely cold weather or under low power driving conditions. The auxiliary means consists of a booster heater of the internal combustion type, through which the water from the engine passes on its way to the heat exchanger in the heating system. The operation of the booster heater is controlled by a thermostatic switch located at the point where the water leaves the engine, and it is so arranged that whenever the temperature of the water at that point falls below a predetermined figure, the booster heater is automatically started in operation to supply additional heat to the water, and when the temperature of the water leaving the engine rises to the proper degree, the thermostatic switch operates to shut off the booster heater. The latter may also be utilized to keep the engine temperature up to a desired point for maximum efficiency during operation, or to keep the engine warm while it is not being operated, to facilitate starting and to prevent freezing in cold weather.

A still further object is to provide such a system wherein many of the elements which are used to heat the coach in cold weather may in hot weather be used to cool and ventilate the coach, simply by adding refrigerating mechanism and valves and piping therefor to the system and by setting certain control switches to another position.

Other objects and advantages will be apparent upon reference to the description and accompanying drawings, in which:

FIGURE 1 is a side view of a coach, with portions broken away to illustrate certain features, showing the improved heating and ventilating system associated therewith.

FIGURE 2 is an enlarged view showing the duct and tubing arrangement in the region immediately back of the operator's seat.

FIGURE 5 is a transverse sectional view through one of the upper corners of the coach showing the arrangement of one of the principal heat distributing ducts.

FIGURE 6 is an elevational view of the front end of the coach.

FIGURE 7 is a sectional view, taken on the line 7—7 of FIGURE 6.

FIGURE 8 is a sectional view, taken on the line 8—8 of FIGURE 7.

FIGURE 12 is a sectional view, taken on the line 12—12 of FIGURE 1.

FIGURE 13 is a sectional view, taken on the line 13—13 of FIGURE 1.

FIGURE 14 is a view of the control panel located adjacent the operator's seat.

FIGURE 17 is a diagrammatic view of the booster heating means and associated parts together with the electrical circuits therefor.

FIGURE 18 is a side elevational view of the booster heating means.

FIGURE 19 is a plan view of the structure shown in FIGURE 18.

FIGURE 20 is a wiring diagram of the electrical control circuits.

FIGURE 21 is a schematic diagram of a modified form of system, in which refrigeration means has been added in order that the system may be utilized for cooling purposes in hot weather.

FIGURE 22 is a chart illustrating the amount of moisture that can be held as vapor by air at various temperatures.

FIGURE 23 is a chart showing how the moisture absorbing properties of outside air being taken into the coach are raised as the temperature of the air is increased by heating it.

Figure 9:
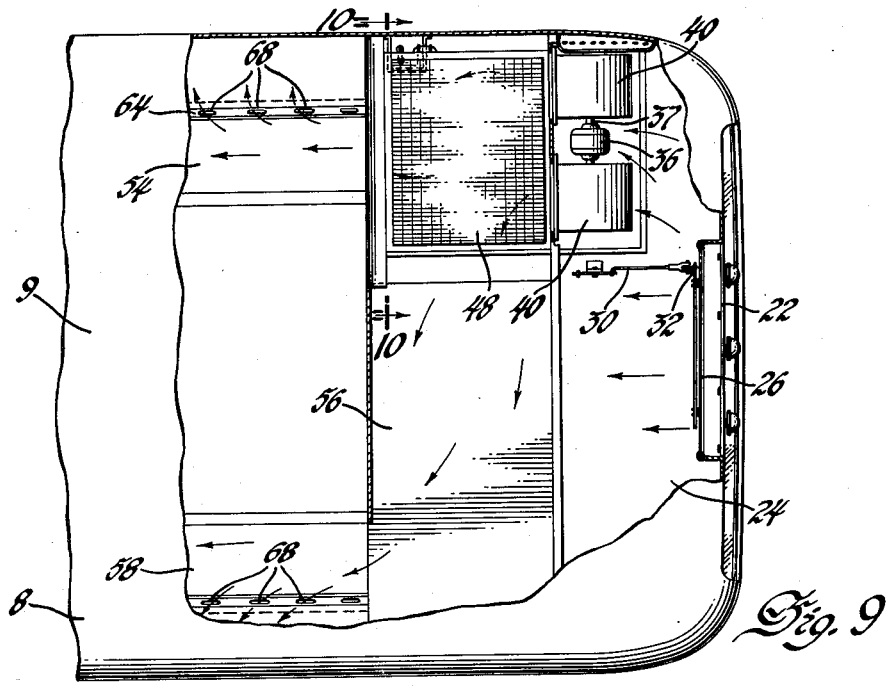
FIGURE 9 is a sectional view, taken on the line 9—9 of FIGURE 1.

Referring to FIGURE 1, the numeral 8 indicates a coach body having a double-walled roof 9, side walls 10, windows 11, an operator's seat 12 and a plurality of passenger seats 14. The engine 16 is located at the rear of the coach in a compartment 18. At the front end of the coach, adjacent the top thereof, is an air intake opening 20, covered by a grille 22, through which outside air may flow into a chamber 24. As best shown in FIGURES 7–9, a door 26 located in the chamber 24 and pivotally supported at 28, may be adjusted to completely or partially close the opening 20, it being controllable by the operator through a link 30 which is connected to lever 32 secured to rod 34 which is attached to the door.

Figure 10:
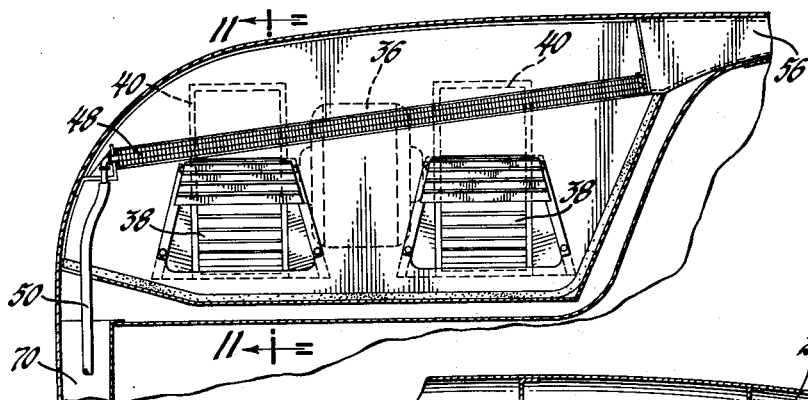
FIGURE 10 is a sectional view, taken on the line 10—10 of FIGURE 9.
Figure 11:
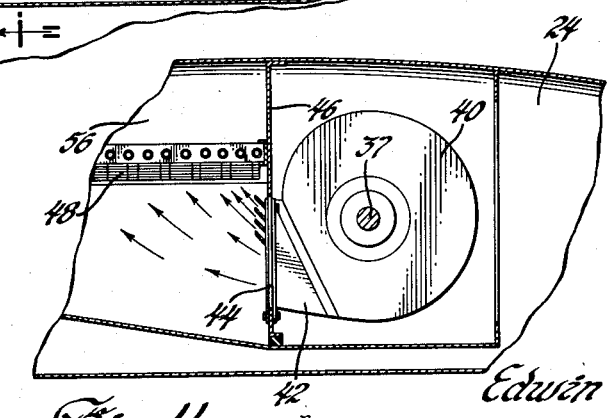
FIGURE 11 is a sectional view, taken on the line 11—11 of FIGURE 10.

Located in the chamber 24 is an electric motor 36 which serves to drive two blowers 38 which are mounted in blower housings 40 located at opposite ends of the motor shaft 37. The outlets 42 of the blower housings are connected to openings 44 in a partition 46 which extends all the way across the coach to form the rear wall of the chamber 24. As best shown in FIGURES 10 and 11, located above the openings 44 and extending substantially horizontally, is a heater core 48 which is adapted to receive hot water from the engine cooling circulating system, or from the booster heater to be described later, through pipe 50 from a system of piping to be described later, the water being returned to the system through pipe 52.

Figure 3:
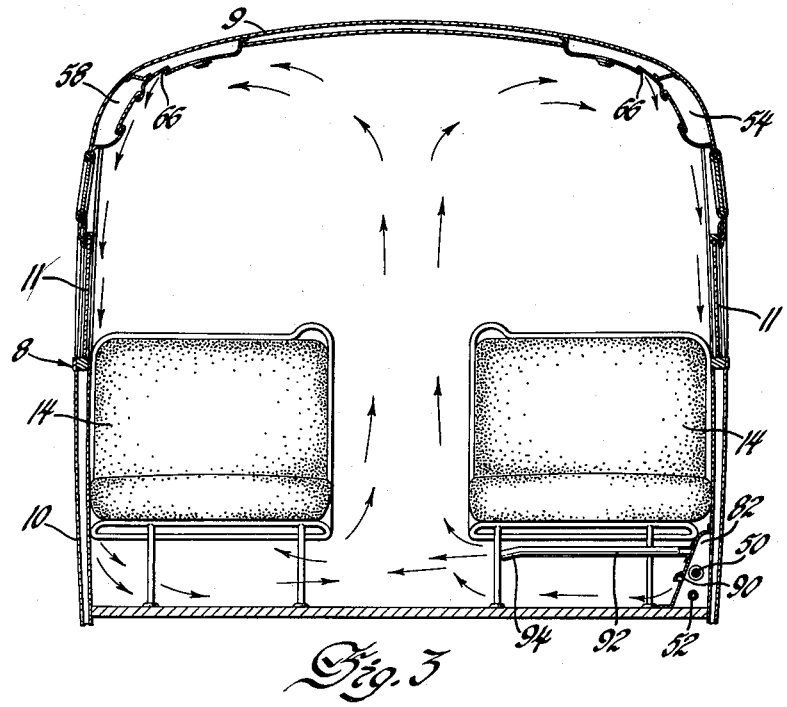
FIGURE 3 is a transverse sectional view, taken on the line 3—3 of FIGURE 1.
Figure 4:
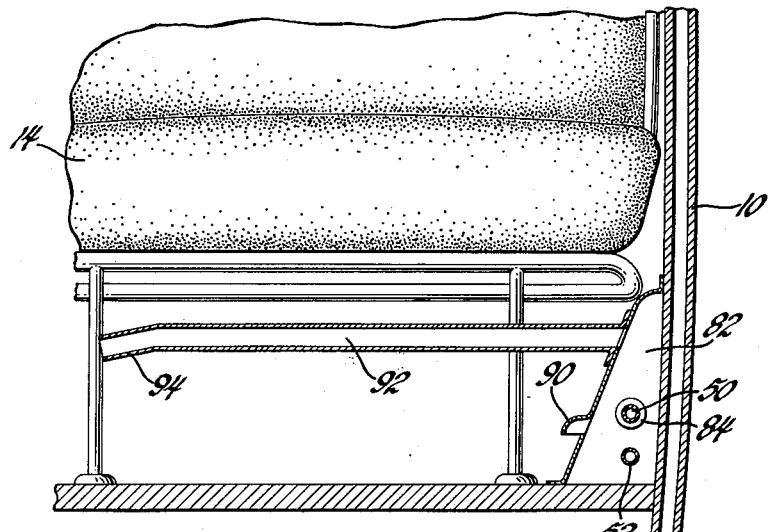
FIGURE 4 is an enlarged transverse sectional view, showing the arrangement of air distributing ducts under the seats.

After the air entering from outside the coach passes upwardly through the core 48, some of it flows rearwardly through a longitudinally extending duct 54 located at the junction of the side and the roof of the body at the left side thereof, as shown in FIGURES 3 and 5. Another portion of the air flows across the coach through a transversely extending duct 56, located behind the chamber 24, from which it flows into another longitudinally extending duct 58, which is similar in shape to the duct 54, but is located at the right side of the body. Both of the ducts 54 and 58 extend the full length of the body, and as best shown in FIGURE 5, each of them is formed of an upper sheet of metal 60 having its upper end secured to the roof, and a lower sheet 62 having its lower end secured to the side of the body. The lower end of the sheet 60 extends downwardly a slight amount past the adjacent end of the sheet 62 and is separated therefrom by a spacer 64 to form a relatively narrow slot 66 which extends the full length of the duct, there being a plurality of elongated holes 68 formed in the spacer to allow the air to flow downwardly from the duct through the slot, the velocity being sufficiently high to cause the air to follow the side wall of the body all the way to the floor, the air flowing over the inner surface of the windows 11 in doing so, as shown by the arrows in FIGURES 3 and 5. Upon reaching the floor, the air flows inwardly toward the center of the coach and then rises toward the roof, as indicated by the arrows in FIGURE 3. As it approaches the roof, it is drawn outwardly and then downwardly again by entrainment or the suction effect of the air being discharged through the slots 66 at each side of the coach, so that there is a continuous circulation of air within the body.

Under certain conditions, such as during extremely cold weather, it may be desirable to recirculate part of the warm air from within the coach instead of taking all of the air for the ducts from outside. To do this, the operator simply opens a damper in the bottom wall of the overhead chamber 24, which allows a certain percentage of the air from within the coach to be drawn into the chamber by the blowers 38 and to be recirculated through the ducts 54 and 58.

As shown in FIGURES 1, 2 and 10, some of the air being discharged beneath the heater core by the blowers 38 is forced downwardly through a vertically extending duct 70 located adjacent the rear of the operator's seat at the side thereof. The pipes 50 and 52 conveying hot water from the engine to the heater core 48 and returning it to the engine are located in this duct and serve to heat the air flowing therethrough, there being fins 72 provided on the pipe 50 to increase the amount of heat radiating surface. Located at about the level of the operator's shoulder there is an opening 74 formed in the duct 70, there being a sliding door 76 provided to close this opening. Near the bottom of the duct another opening 78 is formed, through which air for heating the operator's feet may be discharged. The flow of air for this purpose may be regulated by sliding door 80 which is associated with opening 78.

Extending along the left side of the coach at the floor line, as shown in FIGURES 1 to 4, is a duct 82 through which the hot water pipes 50 and 52 run, the pipe 50 having fins 84 on it within this duct to increase the heat-radiating surface. Adjacent the front end of the duct 82 and connected thereto by tube 87 is a blower 86 adapted to be driven by an electric motor 88, the air from the blower being forced into the duct and being discharged therefrom through louvres 90 and tubes 92, one of each of these being located under each of the passenger seats 14 on the left side of the coach. The warm air being discharged through the louvres 90 heats the feet of the passengers on that side of the coach, while that being discharged through the tube 92 heats the feet of the passengers on the other side of the coach, the end 94 of the tubes 92 being inclined downwardly to cause the air to be discharged toward the floor on the opposite side of the coach.

Since under normal conditions the air being utilized to heat and ventilate the interior of the coach body is taken in from outside through the opening 20, some provision must be made to allow this air to escape. As shown in FIGURE 1 this is accomplished by providing an outlet opening 96 in the body side wall adjacent the operator's seat, which opening is covered by a screen 98 and may be partially or completely closed by a door (not shown) which is located on the outside of the body and which may be adjusted to the desired position by the operator by means of a handle 100 which extends into the body. However, even when fully uncovered, the area of the outlet opening 96 is so much smaller than that of the inlet opening 20 that a pressure somewhat greater than atmospheric is built up inside the coach body, for the purpose of insuring that any leakage of air around the door and window openings will be outward rather than inward, thus eliminating cold drafts.

Turning now to the water circulating system, hot water leaves the jacket of the engine 16 through a pipe 102 which conducts it to a heater water pump 104 which is driven by electric motor 106. The water discharged from the pump flows through check valve housing 107 and pipe 108 to the hot water jacket 186 of a booster heater, indicated generally at 112, and which will be described later. After flowing through the jacket 186 the water is forced through pipe 114 back up into the check valve housing 107 and then into a diversion valve indicated generally at 116. The check valve housing 107 is of conventional construction, containing a spring seated valve which is adapted to be forced off its seat when the pressure of the water going to the booster heater exceeds that amount. Its function is to protect the booster heater against pressures in excess of that by diverting the water straight through the check valve housing without allowing it to go through the booster heater.

Figure 15:
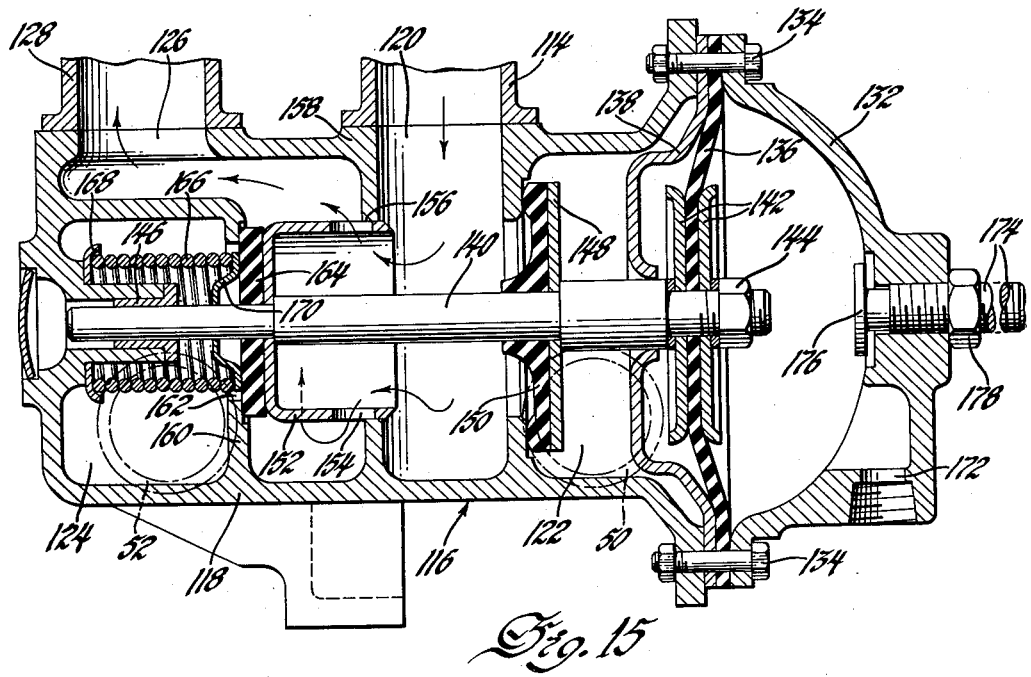
FIGURE 15 is a sectional view through the diversion valve which controls the flow of hot water from the engine to the heater core.

The diversion valve 116, which is shown in detail in FIGURE 15, consists of a housing 118 having an inlet port 120 to which the pipe 114 is connected, and an outlet port 122 to which is connected the pipe 50 which conducts the hot water to the heater core 48. Pipe 52 through which water returns from the heater core is connected to a port 124, and this returning water leaves the diversion valve through port 126 to which pipe 128 is connected. The pipe 128 conducts the water back to the water pump 130 of the engine. 132 is a cap which is secured to the housing 118 by bolts 134, there being a diaphragm 136 of flexible material and a supporting member 138 clamped between the cap and the housing. A stem 140 is connected to the diaphragm by plates 142 and nut 144 threaded on the end of the stem, the latter being supported at this end in member 138 and at the other end in bushing 146 and being longitudinally slidable therein. Secured to the stem is a disc 148 which carries a valve member 150 formed of material such as synthetic rubber. Also secured to the stem 140 is a cup-shaped valve member 152 having holes 154 formed in its side wall, the latter fitting closely within and being slidable in an opening 156 in wall 158 which is located in the housing between ports 120 and 126. Another wall 160, located in the housing adjacent ports 124 and 126 and separating the two from each other, has an opening 162 formed in it, and a disc 164 of material such as synthetic rubber, secured to the central portion of the member 152 is adapted to seat against the wall 160 to close the opening 162 therein. A compression spring 166, resting upon a washer 168 seated in the housing bears against washer 170 which is in contact with disc 164, and tends to move the stem 140 and the valves carried by it to the right as viewed in FIGURE 15. This tendency is however overcome by the admission of compressed air to the space within the cap 132 through opening 172 by means of a control to be described later. When compressed air has been so admitted to this space, the diaphragm 136 is forced inwardly thereby moving the stem 140 so that the mechanism assumes the position shown in FIGURE 15. Threaded into the cap 132 is a member 174 which may be screwed down so that its head 176 engages the end of the stem 140 to hold the valves in the position shown in FIGURE 15 when the heating system is not going to be operated for some time as during the summer months. 178 is a lock nut which may be tightened to hold the member 174 in that position.

The booster heater, which has been designated generally by the numeral 112, is shown in FIGURES 17, 18 and 19. It consists of a combustion chamber 180 in which fuel oil is adapted to be burned, the heat being conducted by fins 182 to a casing 184 which forms the inner wall of a water jacket 186, the outer wall being the shell 188 which has connected into it the pipe 108 leading from the heater water pump 104, and pipe 114 which leads from the booster heater to the diversion valve 116.

Fuel oil is supplied to the booster heater from tank 190 through pipe 191 by pump 192 driven by electric motor 193, flowing through filter 194 and being discharged from the pump through pipe 196 which conducts it through an electrically actuated valve 198 up to a nozzle 200 through which it is injected into the combustion chamber 180. 202 is a gauge serving to show the pressure under which the fuel oil is being supplied to the combustion chamber. Air is forced into this chamber along with the fuel oil by blower 204 driven by motor 205. The mixture of oil and air is ignited by spark plug 206 operated from ignition coil 208 which receives an interrupted supply of electricity from the vibrator 210. 212 is a pipe which conducts the products of combustion from the space 183 between the combustion chamber and the casing 184 to a point at the rear of the coach where they are discharged into the atmosphere.

The electrical system is operated on 12 volts, direct current supplied by a battery 214 which is connected by wire 216 to a control switch 218 and by wire 220 to a relay 222, wire 224 leading from this relay to the motor 106 of the heater water pump 104. Wire 226 leads from the battery to a 5 volt relay 228 from which wire 230 runs to a low water switch 232 which becomes opened whenever the level of the water in the jacket 186 becomes too low for safe operation. Wire 234 extends from switch 232 to the fuel pump motor 193 and the blower motor 205.

238 is a switch in which the free end of an arm 240 rests on contacts 242 and 243 when the booster heater is started in operation. Contact 242 has connected to it wire 244 leading to winding 246 in a warp switch 248. The other end of arm 240 is connected by wire 250 to contact 252 in the warp switch. The free end of an arm 254 normally rests on contact 252, the opposite end being connected by wire 256 to an engine temperature switch 258, which in turn is connected by wire 260 to the control switch 218. Also connected to wire 250 is a wire 262 leading through winding 264 of relay 222 and thence to ground.

243 is another contact which the switch arm 240 rests on when the booster heater is started in operation, and wire 268 leads from this contact to the vibrator 210, wire 270 leading from the vibrator to the ignition coil 208, the other side of which is grounded, and wire 272 conducting the high frequency current to the spark plug 206.

Located in the combustion chamber 180 is a thermostatic element 274 having a portion 276 extending therefrom. Within a few seconds after the booster heater is started in operation and element 274 becomes heated, the portion 276 moves outwardly and forces switch arm 240 away from contacts 242 and 243 thereby opening the circuit through the warp switch coil 246 and at the same time cutting off the ignition which is no longer needed. The function of the warp switch is to cut off the supply of fuel to the booster heater if the latter does not heat up within a few seconds, thereby preventing danger of an explosion due to an accumulation of unburned fuel in the combustion chamber. Should the warp switch be actuated due to failure of operation of the booster heater, arm 254 would be moved away from contact 252 and would be moved against contact 278, thereby lighting telltale light 280 located on the control panel adjacent the operator.

When portion 276 moves switch arm 240 away from contacts 242 and 243, it moves it against contact 282 which has wire 284 leading from it to a limit switch 286 located in the outlet 114 of the water jacket 186 of the booster heater. This limit switch consists of an arm 288 which normally rests on contact 290 but which is adapted to be moved upwardly by expansion of a member 292 which extends into the water jacket, if for any reason the temperature of the water should become too high. Wire 294 leads from contact 290 to coil 296 which actuates fuel solenoid valve 198, the other side of this coil being grounded, and also leads to coil 298 of relay 228, the other side of this coil likewise being grounded.

Figure 16:
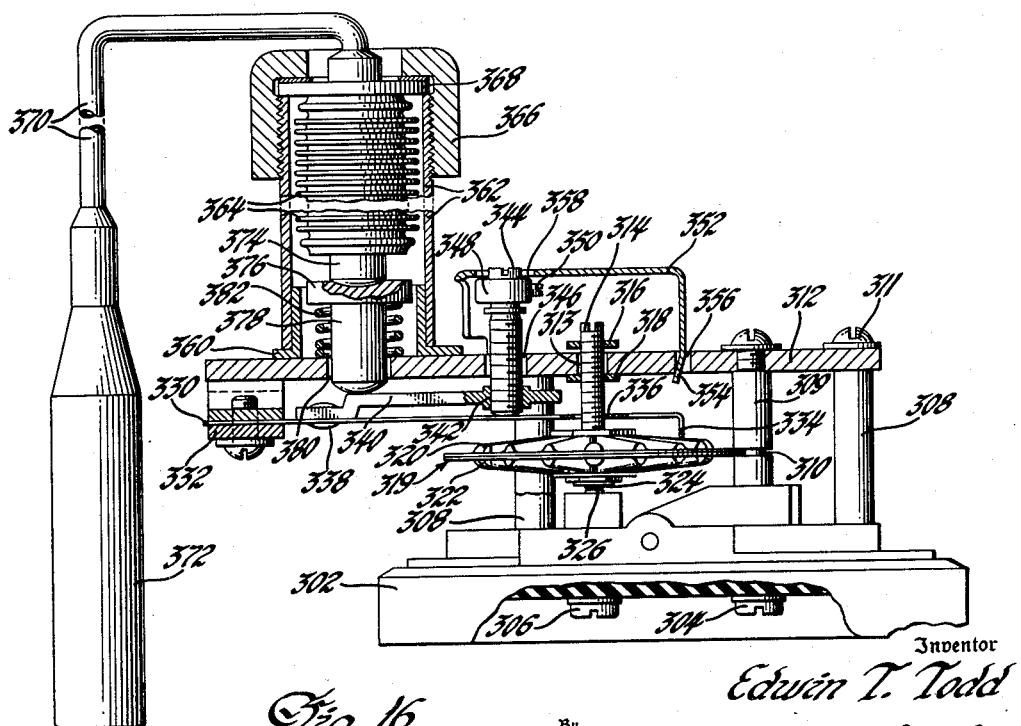
FIGURE 16 is a sectional view through the thermostatic control for regulating the flow of hot water to the heater core.

Referring now to FIGURES 1 and 13, the numeral 300 represents a thermostat located in the air duct 54. It will be referred to hereafter as the duct thermostat, and the details of its construction are shown in FIGURE 16, wherein 302 is a base formed of insulating material carrying terminals 304 and 306. Extending from the base are two sets of posts 308 and 309, there being three of the latter which are equally spaced about the center of the terminal 306. Each of the posts 309 has an annular groove 310 formed in it. Secured to these posts by screws 311 is a metal plate 312. Extending through a hole 313 in this plate is a threaded member 314 having nuts 316 and 318 on it, which nuts may be adjusted to engage opposite faces of the plate 312 to limit upward or downward movement of the threaded member. Secured to the end of this member is an expansible element 319 composed of two thin ribbed metallic discs 320 and 322, the outer edge of which are hermetically sealed together, the central portions being spaced apart to form a chamber which is adapted to receive a fluid which expands in proportion to the amount of heat it is subjected to, which expansion of course causes the central portions of the discs to tend to move apart. The outer edges of the discs fit within the grooves 310 in the posts 309, so that the outer periphery of the expansible element is rigidly supported at three points.

Disc 322 carries a contact point 324, and as the element 319 expands due to rising temperatures, the central part of disc 322 tends to move away from disc 320, thereby bringing contact 324 into engagement with a contact 326 carried by the base, this contact being electrically connected to terminal 306.

To adjust the operating range of the thermostat, a spring arm 330, supported at one end on bridge 332 carried by plate 312, is provided. The opposite end of the arm is bent to form a tip 334 which is adapted to bear against the outer surface of the intermediate portion of disc 320. There is a hole 336 provided in the arm at the point where the threaded member 314 passes through it, this hole being large enough so that the arm does not touch the threaded member. Secured to the arm by rivet 338 is a bar 340 having an opening 342 provided in it, and an adjusting screw 344 is threaded into this opening, the lower end of the screw being adapted to bear against the spring arm. The central portion of the screw 344 extends through an enlarged hole 346 in the plate. The upper end of the screw is slotted and has a collar 348 connected to it by a set screw 350. A cover 352, secured to the plate 312 by a plurality of tabs 354 which snap into slots 356 formed in the plate, extends over the end of threaded member 314 and collar 348, there being an opening 358 in the cover through which the slotted end of the screw 344 extends, so that it may be turned with a screw driver to adjust it to the desired position without removing the cover.

It will be seen that as the adjusting screw 344 is rotated in one direction, it will apply pressure against the spring arm which will cause the tip 334 to press against the expansible element 319. This tends to bias the latter in a downward direction so that less expensive movement is required to bring contact 324 into engagement with contact 326. Conversely, when screw 344 is rotated in the opposite direction, the tip 334 of arm 330 will exert less pressure against the expansible element, so that the latter must expand further to bring contact 324 against contact 326. There are direction and graduation marks (not shown) appearing on the cover 352 around the edge of the opening 358 to indicate which way the screw should be turned to increase or decrease the amount of heat which will be required to cause the thermostat to bring contacts 324 and 326 together, thereby closing the circuit through the thermostat.

The duct thermostat is provided with a compensating device which consists of the following described structure. Secured to the plate 312 by flange 360 is a tube 362 within which is located a bellows 364 held in place by a cap 366 which is threaded on the tube and clamps a flange 368 secured to the bellows against the end of the tube. Connected to the bellows is a capillary tube 370 having a bulb 372 secured at its end, the bulb and tube being filled with expansible fluid. The bellows has a projection 374 secured at the opposite end, and this projection engages the head 376 of a member 378 which extends through a hole 380 in the plate 312, there being a compression spring 382 located between the head 376 and the plate. The end of the member 378 engages the bar 340 which is secured to the spring arm 330.

As stated above, this duct thermostat is located in the air duct 54 and the expansible element 319 is therefore affected by the temperature therein to control the operation of the heating equipment in a manner to be described later. However, under some conditions of operation of the coach, such as when it passes from a shady area into the bright sun, or when the number of passengers increases suddenly, the duct thermostat without the compensating attachment might not cut off the supply of heat quick enough, with the result that the interior of the coach would become too hot. The purpose of the compensating device is to make the duct thermostat respond more quickly to sudden changes in temperature within the coach body. Therefore, the bulb 372 is located at a point outside of the duct 54, such as under the roof 9 and adjacent the center of the coach, where it is housed within a casing 384, as shown in FIGURES 1 and 12, the casing being provided with a plurality of holes 386 to permit the air within the coach body to circulate therethrough to an air outlet in the coach roof.

The operation of the compensating device is as follows:

Should there be a sudden increase in the temperature of the air within the coach due to an increase in passenger load or solar effects on the roof, for instance, the fluid within the bulb 372 and tube 370 expands, causing the projection 374 on the bellows to force the member 378 against the bar 340, and since the bar is attached to the spring arm 330, the latter is forced downwardly causing the tip 334 to be pressed against the expansible element 319. This moves the latter downwardly so that less expansive movement of it is required to bring contact 324 carried by it into engagement with contact 326.

Located within the casing 384 is another thermostat 388, which will be referred to as the over-rule thermostat, it being shown in FIGURE 12 and its construction being similar to that of the duct thermostat previously described, except that it does not include the compensating attachment, and it is enclosed in a housing 390 and is adjusted by means of a knob 392. It is provided with contacts 394 and 396 corresponding to the similar contacts in the duct thermostat.

Located adjacent the operator's seat is a control panel 400, shown in FIGURE 14, containing the various switches which serve to control the operation of the heating and ventilating equipment. These are the blower switch 402, the heat control switch 404, the booster heater switch 218, and the defroster switch 406. The telltale light 280 which indicates failure of the booster to operate is also mounted on this panel.

One of the functions of the booster heater is to supply heat to the engine to facilitate starting and to maintain it at a temperature which will result in maximum operating efficiency. Therefore, in describing the operation of the foregoing described equipment, it will be assumed that the coach has been standing in the garage and that the engine has not been operating and is therefore cold. In that case, the operator first moves the booster heater switch 218 up to on position and the heat control switch 404 up to "automatic" position. This starts the booster heater 112 in operation and the water which is being forced through the jacket 186 thereof by the pump 104 will circulate through the water jacket of the engine and will serve to cause the latter to become heated. As soon as the engine temperature is up to normal, the engine can be started and the blower switch 402 is then placed in "heating" position. Under this condition, the water from the engine cooling system is forced by pump 104 through the booster heater 112, the diversion valve 116 and pipe 50 up to core 48, and from the latter back through pipe 52 and the diversion valve and pipe 128 to the engine water pump 130.

Since the blowers 38 are being driven by motor 36, air will be drawn in through opening 20 at the front end of the coach and will be forced through the core 48, whereupon it will become heated and thereafter will be forced through the ducts 54 and 58, from which it will be discharged at high velocity through the elongated slots 66, downwardly over and in thermal contact with the inner surfaces of the windows 11, circulating in the manner previously described between the windows and the ambient air within the body. At the same time, some of the heated air will flow downwardly through the duct 70, from which it may be discharged through openings 74 and 78 to keep the operator warm. Also at this time, the blower 86 is being driven by motor 88 to force air through the duct 82, which air becomes heated by the hot water flowing through pipes 50 and is then discharged horizontally adjacent the floor level through louvres 90 and tubes 92 to warm the passengers' feet. Thereafter when the temperature of the air within the coach reaches a point high enough so that both the duct thermostat and the over-rule thermostat are satisfied, i.e., where the expansible elements in each of them have expanded enough to bring contacts 324 and 326 together in the duct thermostat, and contacts 394 and 396 together in the over-rule thermostat, this portion of the electrical circuit will be closed, as shown in FIGURE 20, energizing coil 410 of heat control relay 412 and thereby moving member 414 down to close the circuit between contacts 416 and 418, the former being connected by wire 420 to contact 422 on the blower switch 402 and by wire 424 to coil 426 of the water pump control relay 428. The opposite ends of coils 410 and 426 are both grounded and are connected by wire 430 with the telltale light 280.

Contact 418 is connected by wire 432 to contact 462 on control switch 404 and to contact 436 on blower switch 402, also by wire 438 to coil 440 of a magnetic valve 442, to the housing 444 of which compressed air is supplied through a pipe 446 from a compressor (not shown). When the coil 440 is energized by closing of the circuit across contacts 416 and 418, as when the circuit through both thermostats is closed, valve 442 will be pulled upwardly against a spring by coil 440 and the compressed air entering the valve housing will flow out through pipe 448 to the diversion valve 116, where it enters cap 132 through opening 172.

As soon as the engine has become warmed up to the point where the temperature of the cooling water leaving it reaches 165°, an engine temperature switch 258 located on the engine at the point where the water enters the pipe 102, operates to open the electrical circuit through the booster heater, which causes the latter to cease operation. Since the motor 106 which drives the heater water pump 104 is in this circuit, it likewise will cease operating at the same time as the booster heater, unless either of the thermostats 300 and 388 are still calling for heat, in which case it will not cease operating.

In other words, whenever the temperature of the water coming from the engine is high enough to provide the amount of heat required to heat the interior of the coach, it is not necessary for the booster heater to operate.

The booster heater will not start operating again until the temperature of the engine cooling water falls below 155°, whereupon the engine temperature switch 258 will operate to close the circuit through the booster heater and the heater water pump motor, placing them in operation again.

Under the condition of operation where the water from the engine is hot enough to supply the amount of heat necessary to keep the interior of the coach warm without requiring the operation of the booster heater, the blowers 38 and 86 will keep operating to circulate the warm air as described. When the temperature of the air within the coach reaches a point high enough so that both the duct thermostat 300 and the over-rule thermostat 388 are satisfied, i.e., where the expansible elements in each of them have expanded enough to bring contacts 324 and 326 together in the duct thermostat, and contacts 394 and 396 together in the over-rule thermostat, this portion of the electrical circuit will be closed, as shown in FIGURE 20, energizing coil 410 of heat control relay 412 and thereby moving member 414 down to close the circuit between contacts 416 and 418, the former being connected by wire 420 to contact 422 on the blower switch 402 and by wire 424 to coil 426 of the water pump control relay 428. The opposite ends of coils 410 and 426 are both grounded and are connected by wire 430 with the telltale light 280.

Contact 418 is connected by wire 432 to contact 462 on control switch 404 and to contact 436 on blower switch 402, also by wire 438 to coil 440 of a magnetic valve 442, to the housing 444 of which compressed air is supplied through a pipe 446 from a compressor (not shown). When the coil 440 is energized by closing of the circuit across contacts 416 and 418, as when the circuit through both thermostats is closed, valve 442 will be pulled upwardly against a spring by coil 440 and the compressed air entering the valve housing will flow out through pipe 448 to the diversion valve 116, where it enters cap 132 through opening 172. The air pressure thereupon depresses diaphragm 136, moving it and the valves carried by stem 140 to the position shown in FIGURE 15, wherein the water coming from the engine through pipe 114 flows through holes 154 in valve member 152 and returns to the engine through pipe 128. This means that the supply of hot water to the heater core 48 is shut off, and will remain shut off until the circuit through one or both of the thermostats 300 and 388 becomes opened due to a lowering of the temperature of the air within the coach, whereupon the magnetic valve 442 will become closed and will shut off the air pressure to the diversion valve 116. This results in spring 166 moving stem 140 and valves 148 and 150 to the right, as viewed in FIGURE 15, thereby opening the passage for water entering the housing through pipe 114 to flow out through outlet port 122 and pipe 50 to the heater core 48. The water returning from the latter will then flow through pipe 52 and port 124 into the diversion valve housing, and leave the latter through port 126 and pipe 128 through which it returns to the engine.

In other words, hot water from the engine flows through the liquid heating circulating system and through or around the booster heater at any time when the circuit through either of the thermostats 300 and 388 is open, and is only shut off from series connection to the coach heating liquid circulating system containing the heater core when the circuits through both of these thermostats is closed. There is no need for heat at that time since if the circuits through both of these thermostats are closed, there is the desired amount of heat within the coach. It will be understood, of course, that the settings of either thermostat may be changed by adjusting the position of the screws 344 in them to make them operate within the desired temperature ranges.

Blower switch 402 has arm 450 which is connected by wire 452 to wire 454 which leads to battery 214 and to engine ignition switch 456. When the latter is closed, current flows through wire 458 to arm 460 of heat control switch 404 and to defroster switch 462 from which it leads to motor 464 which drives defroster fan 466, the latter being located in a position beneath the windshield so that it may force air against the latter to keep the windshield clear.

It will be seen from the above that the thermostats 300 and 388 only serve to control the operation of the heating equipment when the heat control switch 404 is in the "automatic" position, which is when the arm 460 is on contact 434. When the control switch 404 is in the middle position, as shown in FIGURE 20, it is in what is marked "Emerg. Heat" position on the control panel 400. When it is in this latter position, hot water is circulated through the heater core regardless of thermostat action, and the blowers 38 and 86 will operate. This is to allow a quick warm-up of a cold coach as when starting operation thereof. As soon as the interior of the coach becomes heated, the switch 404 should be moved to the "automatic" position. When arm 460 is on contact 462, switch 404 is in "off" position, and the circuit is completed from wire 458 through wire 432 to contact 436 on blower switch 402.

When heat control switch 404 is in the "automatic" position and has energized heat control relay 412 so that member 414 rests on contacts 416 and 418, current flows through wire 424 to coil 426 of relay 428, energizing the latter so that member 468 closes the circuit in line 470 to operate both the motor 106 which drives the heater water pump 104 and the motor 88 which drives the floor heater blower 86. The current is at the same time flowing through line 432 up to contact 436 of the blower switch 402, and when the arm 450 on the latter is in the "heating" position, the circuit is completed from contact 436 to contacts 472 and 474 by arm 450, and flows through wire 476 to coil 478 of magnetic switch 480 and then through a cold shut-off thermostatic switch 482 to ground. This energizes switch 480 causing contact member 483 of it to close the circuit in line 484 which leads to the heater blower motor 36. Thermostatic switch 482 is mounted adjacent the heater core 48, and it is designed to open at a temperature of 40°. Its purpose is to shut off the heater blower motor if the temperature of the air flowing through the heater core 48 should fall below 40°, in order to prevent forcing air that cold through the core and possibly freezing it, since the liquid circulating system is designed to operate without any anti-freeze in it, the booster heater serving to supply heat to the engine whenever the latter is not operating and requires heat to keep the cooling water from freezing, as will be described later.

When the system is to be operated normally in cold weather, the operator places all of the switches on the control panel 400 in the up position. This puts the blower switch 402 in "heating" position, the heat control switch 404 in "automatic" position and the booster heater switch 218 and the defroster switch 406 in on position. As described above, when these control switches are in this position, hot water from the engine is forced up to the heater core 48 as long as either the duct thermostat 300 or the over-rule thermostat 388 are in the open-circuit position where they are calling for heat. At this time, both the heater blower motor 36 and the floor heater blower motor 88 are operating, and the defroster motor 464 is also on. The booster heater may or may not be operating, depending upon whether the temperature of the water coming from the engine is above 165°. If it is, then engine temperature switch 258 which controls the operation of the booster heater will be open so that the latter will not be operating. If the temperature of the water leaving the engine is below 155°, then switch 258 will be closed and the booster heater will operate to add heat to the water flowing to the heater core 48. As soon as the temperature within the coach rises to the desired point at which the two thermostats 300 and 388 are set to close the circuits through them, magnetic valve 442 will be moved to let compressed air flow into the diversion valve 116, moving the latter to the position wherein it cuts off the flow of hot water to the heater core and returns it to the engine. At this time the circuits to the heater blower motor 36 and the floor heater blower motor 88 will be opened, so they will cease operating.

If the telltale light 280 should come on, the operator would be warned that the booster heater has failed to operate as it should, and he would then then have to investigate to locate the trouble, and after that has been done, would have to manually reset the particular switch in the booster heater electrical circuit which had opened to protect the equipment.

In mild or warm weather when no heating action is required, the system may be operated solely for ventilating purposes. To accomplish this, the heat control switch 404 and the booster heater switch 218 on the control panel 400 are turned down to off position, and the blower switch 402 is turned down to the position marked "Vent." When switch 402 is in this position, as shown in FIGURE 20, current flows from line 454 through wire 452 and switch arm 450 to contact 472, which is connected to contact 474, from which it flows through wire 476 through coil 478 of magnetic switch 480 and through thermostatic switch 482 to ground. This causes contact member 483 of switch 480 to close the circuit in line 484 and thereby operate the motor 36 which drives blowers 38, which force unheated air through the ducts 54 and 58 from which it is discharged through slots 66 and serves to ventilate the interior of the coach.

The booster heater may be utilized to keep the engine warm during cold weather when it is not to be operated for considerable lengths of time, such as overnight. When this is to be done, the booster control switch 218 is turned up to the position marked "booster" on the control panel, and the blower switch 402 and heater control switch 404 are both turned to off positions. This allows the booster heater and the heater water pump 104 to operate, whenever the engine temperature switch 258 is closed due to the temperature of the water in the engine being below 155°. When the booster heater and the pump 104 are operating, the flow of water is from the engine through the booster heater, diversion valve 116, heater core 48, and then back through the diversion valve to the engine again. Since the heater blower is not operating, very little heat is transferred to the coach interior. As soon as the water in the engine water jacket reaches a temperature of 165°, the engine temperature switch 258 will open the circuit through the booster heater and the water pump 104, so that both of them will cease operating, and will not resume operation again until the temperature of the water in the engine falls below 155°. Keeping the engine warm in this manner not only facilitates starting in cold weather, but also makes it unnecessary to use antifreeze in the water of the cooling system, which reduces the cost of operation of the coach. A further advantage of the booster heater is that during extremely cold weather when the coach engine might tend to be overcooled and therefore not operate properly, the booster heater by adding heat to the engine water will serve to raise the tempertaure of the engine up to a point where it can operate efficiently.

One of the important advantages of this heating and ventilating system is that it keeps the inside surface of the coach windows from becoming "fogged" due to condensation of moisture thereon, even in the coldest weather. This is because the air which is discharged downwardly over them from the ducts 54 and 58 is not moisture-laden recirculated air taken from within the coach, but instead is outside air, the relative humidity of which has been greatly reduced by heating it. Tests have proven that the effect of simply recirculating the air within a passenger coach to provide heating is to increase the amount of moisture in the air to the saturation point because the occupants are giving off from one-quarter to one-third of a pound of moisture per person per hour. The amounts of moisture that can be held as vapor by air at various temperatures is shown in the chart in FIGURE 22, wherein the horizontal lines indicate the quantities of moisture in percentages of pounds of water vapor, the vertical lines represent the different temperatures to which the air has been heated, and the curve 490 shows the amount of moisture that can be held by 20 cubic feet of saturated air when the latter has been heated to the different temperatures. Curve 491 shows the amounts of moisture that can be held by the same quantity of air at 50% saturation. Air borne moisture in excess of these amounts at the different temperatures must condense as fog or dew. When warm air at a high degree of saturation comes into contact with cold window glass, it must give up as fog or dew that quantity of moisture which it contains above the new saturation point for the lower temperature resulting from contact with the glass. The result is fogging, and in sub-zero weather, instantaneous frosting. Therefore, it will be readily seen that by utilizing air from outside the coach, which contains a lower percentage of moisture than the air which is being circulated within the coach, and which has been heated to increase its moisture holding capacity, much more effective results in the way of keeping the windows clear of fog can be obtained. The chart in FIGURE 23 shows the "drying" effect of raising the temperature of cold air entering the coach from the outside through the intake opening 20. The horizontal lines represent the various percentages of saturation of the air and the vertical lines the different temperatures the air enters the coach at and is heated to. For example, curve 492 shows that if 100% saturated air enters the coach at −30° F., by the time its temperature has been raised 30° to zero, its percentage of saturation has been reduced to 20% so that its moisture holding capacity has been greatly increased. Curves 493, 494 and 495 similarly show how the moisture holding ability of air entering the coach at zero, at +30° and at +60° is increased by raising its temperature. By heating this cold air at the point of intake, it enters the coach very "thirsty" or in other words, capable of absorbing any available moisture with which it comes in contact. If this so-called "thirsty" air is directed over the window glass it will carry away any moisture clinging thereto or prevent moisture from condensing thereon. Thus there is interposed a dry layer of air between the surface of the window and the more humid interior air in the coach.

Another advantage of this heating and ventilating system is that since outside air in relatively large quantities is being taken into the coach, having heat added to it when necessary, and this air after circulating through the coach escapes through outlet opening 96 and leaks outwardly through the openings around the doors and windows, there is a constant change of air within the coach, which removes smoke or odors which would tend to accumulate if there were merely a recirculating of the air within the coach for heating purposes, the result is a much fresher and more comfortable feeling for the passengers.

FIGURE 21 shows diagrammatically how the foregoing described system may be modified by the addition of refrigeration means so that it may be utilized for cooling purposes in hot weather, as well as for heating in cold weather. Since many of the elements in the modified system remain the same as in that previously described, the same reference characters will be applied to them as far as possible. As in the first described system, when this system is being utilized for heating the coach, hot water flows from the engine 16 through pipe 102 to diversion valve 116, the operation of which is controlled as before by compressed air the flow of which is regulated by a magnetic valve, actuated by mechanism to be described later. When this condition occurs, the diversion valve 116 allows the water to flow through it to heater water pump 104 which forces it to valve 500, which when this system is being operated for heating purposes, would be turned to a position wherein the water from the pump would flow through pipe 502 to booster heater 112, the operation of which is controlled as before by engine temperature control switch 258. After passing through the water jacket 186 thereof, it flows through pipe 504 in which valve 506 is located to a second diversion valve, which is designated generally as 516, its construction and operation being the same as that of the diversion valve 116, it being moved to position where it will cut off the flow of water to the core 48 by the action of the duct thermostat and the over-rule thermostat, whenever both of them are satisfied, as in the first described system.

From the diversion valve 516, when the latter has been moved to open position by the admission of compressed air thereto, the water flows through pipe 508 to heater core 48, from which it returns through pipe 510 to diversion valve 516, and then through pipe 512 back to diversion valve 116, from which it returns through pipe 128 to the engine. When heat is not required the duct thermostat 300 or the over-rule thermostat 388 opens the circuit causing the magnetic valve to admit compressed air to the diversion valve 516, which results in the latter being moved to a position wherein the water entering it from pipe 504 will not flow up to the core, but will be returned through pipe 512 to diversion valve 116 and thence to the engine. It will be understood that the operation of the system, when used for heating, will be controlled by the same controls, both manual and automatic, as in the first described system, such controls having been omitted from the drawing to simplify the latter.

The refrigerating mechanism consists of a compressor 520 which is driven by a small internal combustion engine 522. The refrigerant is pumped by the compressor through pipe 524, in which oil separator 526 is located, to condenser 528 from which it flows through pipe 530 and receiver 532 to expansion valve 534. From the latter it flows through a coil 536 located in heat exchanger tank 538, which tank is filled with water from the engine cooling circulating system, being connected with the latter by pipe 540 which leads from valve 500 to the lower part of the tank and by pipe 542, in which valve 544 is located, which leads from the upper part of the tank, to pipe 504. After passing through the coil 536 and removing the heat from the water in the heat exchanger tank 538, the refrigerant returns to the compressor through pipe 537.

The operation of the refrigerating mechanism is controlled by the following structure. Located in intake manifold riser 546 is a throttle valve 548, the position of which is controlled by link 550 connected to arm 552 of lever 554 which is pivotally supported at 556. Another arm 558 on lever 554 is connected to a thermo-pneumatic control 560, which has connected to it a tube 562 having a bulb 564 at its opposite end, this bulb being located in the water in the heat exchanger tank 538. The connections of this control are such that as the temperature of the water in the tank 538 approaches 32° F., the bellows 560 will contract and through the lever 554 and link 550 will move the throttle valve 548 to nearly closed position, so that the engine 522 will be slowed down to reduce the refrigerating action. As the temperature of the water rises, the reverse action will take place, and the speed of the engine will be increased to provide a more rapid flow of refrigerant through the coil 536, thereby increasing the refrigerating action.

When this modified system is to be used for cooling the interior of the coach the valves 500, 506 and 544 are set to the position shown in FIGURE 21. The flow of water at that time will be from pump 104 through valve 500 and pipe 540 to the heat exchanger tank 538, and from the latter through pipe 542, valve 544, diversion valve 516, and pipe 512 to diversion valve 116. The magnetic valve for controlling the flow of compressed air to diversion valve 116 is actuated by turning on the ignition switch to start the compressor engine 522, the diversion valve then being moved to such position that the water entering it from pipe 512 flows back to water pump 104, rather than going to the engine as when the system is being used for heating.

Since the water being pumped to core 48 from the heat exchanger tank 538 is quite cold, being at times only slightly above freezing, the temperature of the outside air being forced through the core and into the ducts 54 and 58 by the blowers will be lowered considerably, and will serve to cool the interior of the coach. It will be understood that the operation of the system for cooling purposes will be controlled by a duct thermostat 300 and an over-rule thermostat 388 as in the first described system. The booster heater will, of course, not operate under any condition at this time, as the electrical circuit controlling it is open, and the water cannot flow through it because valves 500 and 506 are in such position as to prevent that.

While the specific embodiments of the invention have been shown and described in the specification and drawings, it will be understood that various changes and details of construction and operation may be made without departing from the spirit of the invention or from the scope of the appended claims.

I claim:

1. In a heating and ventilating system for a passenger coach driven by an engine having a liquid cooling circulating system, a liquid heating circulating system connected to said liquid cooling circulating system, a booster heater in said liquid heating circulating system for heating the liquid in said systems, means independent of said engine for heating said booster heater, a coach heating liquid circulating system connected in series to said liquid heating circulating system, a heat radiating member in said coach heating liquid circulating system for heating the interior of said coach, and thermostatically controlled pump means for pumping liquid from said liquid heating circulating system to said coach heating liquid circulating system.

2. In a heating and ventilating system for a passenger coach driven by an engine having a liquid cooling circulating system, a liquid heating circulating system connected to said liquid cooling circulating system, a booster heater in said liquid heating circulating system for heating the liquid in said systems, conduit means in said liquid heating circulating system for by-passing the fluid in said liquid heating circulating system around said booster heater, a coach heating liquid circulating system adapted to be connected in series to said liquid heating circulating system, a heat radiating member in said coach heating liquid circulating system for heating the interior of said coach, thermostatically controlled pump means and valve means associated with said systems and being responsive to the temperature of the air in said coach for connecting said liquid heating circulating system in series to said coach heating liquid circulating system to provide for the flow of liquid from said liquid heating circulating system to said coach heating circulating system when the temperature of the air in said coach falls below a predetermined value, and thermostatically actuated means associated with said engine for obstructing the flow of liquid through said liquid heating circulating system and by-passing said liquid around said booster heater and through said conduit means when the temperature of liquid in said liquid cooling circulating system increases above a predetermined value.

3. An air conditioning system for a passenger coach driven by an engine having a liquid cooling circulating system, a liquid heating and cooling circulating system adapted to be connected in series to said liquid cooling circulating system, a valve for controlling the flow of liquid from said liquid cooling circulating system to said liquid heating and cooling circulating system, heat exchange means associated with said liquid heating and cooling circulating system for heating or cooling the liquid circulated in said system, a coach heating and cooling liquid circulating system adapted to be connected in series to said liquid heating and cooling circulating system, valve means for controlling the flow of liquid from said liquid heating and cooling circulating system to said coach heating and cooling liquid circulating system, heat exchange means within said coach heating and cooling liquid circulating system for heating or cooling the air in said coach, a refrigeration system, conduit means for connecting said refrigeration system in heat exchange relationship with said heat exchange means when the air in said coach is to be cooled, and thermostatically actuated means responsive to the temperature of the air in said coach for controlling the heating or cooling of the air in said coach by said coach heating and cooling liquid circulating system.

4. A heating and ventilating system for passenger coach bodies having window means on one side thereof and inside wall means above said window means, said system comprising a duct adapted to be formed in a coach body adjacent an inner wall of said body and above a window on one side of said body, said inner wall being adapted to extend between said duct and said window and being formed to provide an elongated narrow slot communicating with said duct and extending along the upper part of said window in parallel relation to said window, said slot being formed to direct a high velocity blast of air from said duct in parallel relation to the surface of said inner wall adjacent said slot and between said slot and said window, said surface of said inner wall between said slot and said window being formed to continue and to direct the flow of said blast of air along said wall and upon and in parallel relation to the inner surface of said window, air inlet means formed in said body for admitting outside air to said duct, heat radiating means within said duct for heating said air admitted by said air inlet means, a blower in said duct for increasing the static pressure of said air within said duct to discharge said blast of air through said slot and upon said inner surface of said wall and said window and to continue said blast of air downwardly along said window and in parallel relation to said inner surface of said window to heat said window and to shield said window from the air of higher humidity within said body to prevent condensation of moisture on said window and to decrease the radiation of heat upon said window by persons within said body and adjacent said window.

5. A heating and ventilating system for passenger coach bodies having window means on each side thereof and inside wall means above said window means, said system comprising duct means adapted to be formed in a coach body adjacent an inner wall of said body above said window means on each side of said body, said inner wall on each side of said body being adapted to extend between said duct means and said window means on each side of said body and being formed to provide an elongated narrow slot on each side of said body and communicating with said duct means and extending along the upper part of said window means in parallel relation to said window means on each side of said body, said slot on each side of said body being formed to direct a high velocity blast of air from said duct means in parallel relation to the surface of said inner wall adjacent said slot on each side of said body and between said slot and said window means on each side of said body, said surfaces of said inner walls between said slots and said window means being formed to direct a flow of said blasts of air along said inner walls and upon and in parallel relation to the inner surfaces of said window means, air inlet means formed in said body for admitting outside air to said duct means, heat radiating means within said duct means for heating said air admitted by said air inlet means, blower means in said duct means for increasing the static pressure of air within said duct means to discharge said blasts of air through said slot means and upon said inner surfaces of said walls and said window means and to continue said blasts of air downwardly along said window means and in parallel relation to the inner surfaces of said window means to heat said window means and to shield said window means from air of higher humidity within said body to prevent condensation of moisture on said window means and to decrease the radiation of heat upon said window means by persons within said body and adjacent said window means.

6. A heating and ventilating system for passenger coach bodies as defined in claim 5 and in which said body beneath said windows is formed to provide floor means for supporting the persons within said body and to provide lower inside wall means on each side of said body and extending between said window means and said floor means and to provide ceiling means between said inside walls above said window means, said blower means and said slot means being adapted to continue said blasts of air beyond said window means on each side of said body and along said lower inside wall means and downwardly against opposite sides of said floor means, said blower means and said slot means being adapted to continue said blasts of air inwardly along said floor means toward the middle of said floor means and to continue said blasts of air upwardly at the middle of said floor means to provide an ascending column of air within the middle of said body and to continue said ascending column of air at the middle of said body until said ascending column of air engages said ceiling and divides and flows outwardly toward said slots and moves outwardly and downwardly within and in parallel relation to said blasts of air discharged by said slots.

7. In a heating and ventilating system for a passenger coach body having a plurality of side windows, said coach being driven by an engine having a liquid cooling circulating system, an air inlet in the body through which outside air may enter, a heat-radiating member connected with the circulating system and with said air inlet, a duct extending longitudinally of the body above the windows, said duct being connected to said heat-radiating member and having spaced openings therein adjacent the windows, a blower near said air inlet adapted to force air through said heat-radiating member and said duct and downwardly adjacent the windows, an auxiliary heater connected with said circulating system, a thermostatic control located in the circulating system adjacent the engine and responsive to the temperature of the liquid therein to cause the auxiliary heater to operate whenever the temperature of the liquid falls below a predetermined point, and means associated with the system responsive to the temperature of the air both within said duct and within the coach body to control the flow of liquid to said heat-radiating member.

8. In a heating and ventilating system for a passenger coach body having a plurality of side windows, said coach being driven by an engine having a liquid cooling circulating system, an air inlet in the body through which outside air may enter, a heat-radiating member connected with the circulating system and with said air inlet, a duct extending longitudinally of the body on each side thereof above the windows, said ducts being connected to the heat-radiating member and having openings therein adjacent the windows, a blower adapted to force air through said heat-radiating member into said ducts and downwardly through said openings adjacent the windows, a third duct located at one side of the body adjacent the coach floor, a heat-radiating member disposed in said third duct and receiving heat from the liquid circulating system, a blower adapted to force air through said third duct and to discharge the same therefrom horizontally immediately above the floor of said body, and thermostatic means associated with said system and being responsive to the temperature of the air being circulated within the coach to simultaneously control the flow of liquid to said heat-radiating member and the operation of both blowers.

9. In a heating and ventilating system for a passenger coach driven by an engine having a liquid cooling circulating system, a liquid heating circulating system connected to said liquid cooling circulating system, a booster heater in said liquid heating circulating system for heating the liquid in said systems, means independent of said engine for heating said booster heater, a coach heating liquid circulating system connected in series to said liquid heating circulating system, a heat-radiating member in said coach heating liquid circulating system for heating the interior of said coach, a diversion valve for controlling the flow of liquid in said liquid heating circulating and heating liquid circulating systems, said diversion valve having cooperating ports, and pump means separate from the pump for said liquid cooling circulating system for pumping the liquid through said systems, said valve and pump means being both thermostatically controlled for circulating liquid through said liquid heating circulating system in one position of said valve and for circulating liquid in series through said liquid heating circulating and said heating liquid circulating systems in another position of said valve.

10. A method of heating and ventilating a coach body, comprising drawing outside air into said body at the top of one end thereof, heating said air, forcing said heated air through ducts extending longitudinally on either side of said coach above the windows thereof, forcing said air to circulate in opposing transverse spiral paths from openings in said ducts adjacent said windows so that said heated air moves downwardly along and adjacent the inner surfaces of said windows to the floor of said body, said air continuing inwardly under the seats in said body and upwardly between opposing rows of seats to the top of said body and thence again downwardly by induction, and exhausting said air at the air receiving end of said body so that said spirals of air advance toward said air receiving end.

References Cited in the file of this patent

UNITED STATES PATENTS

| | | |
|---|---|---|
| 1,258,068 | Wetzler | Mar. 5, 1918 |
| 1,739,777 | Bernbaum et al. | Dec. 17, 1929 |
| 1,853,477 | Van Vulpen et al. | Apr. 12, 1932 |
| 1,899,516 | Mabey | Feb. 28, 1933 |
| 1,981,011 | Vernet | Nov. 20, 1934 |
| 1,991,990 | Van Vulpen et al. | Feb. 19, 1935 |
| 2,010,649 | Spencer | Aug. 6, 1935 |
| 2,083,971 | Winter | June 15, 1937 |
| 2,106,515 | Wanamaker | Jan. 25, 1938 |
| 2,118,884 | Fuchs | May 31, 1938 |
| 2,143,827 | Demarest | Jan. 10, 1939 |
| 2,155,632 | Anderson | Apr. 25, 1939 |
| 2,165,939 | Perkins | July 11, 1939 |
| 2,182,449 | Parks et al. | Dec. 5, 1939 |
| 2,300,010 | Rose | Oct. 27, 1942 |
| 2,304,642 | Hans | Dec. 8, 1942 |
| 2,312,996 | Bethenod | Mar. 2, 1943 |
| 2,313,439 | Horton | Mar. 9, 1943 |
| 2,351,096 | Blue | June 13, 1944 |
| 2,388,210 | Hanson et al. | Oct. 30, 1945 |
| 2,391,408 | Galamb et al. | Dec. 28, 1945 |
| 2,481,630 | Tramontini | Sept. 13, 1949 |
| 2,526,560 | Hans | Oct. 17, 1950 |
| 2,546,785 | Rose | Mar. 27, 1951 |
| 2,696,155 | Ahrens | Dec. 7, 1954 |